US008144729B2

(12) United States Patent
Pickett

(10) Patent No.: US 8,144,729 B2

(45) Date of Patent: *Mar. 27, 2012

(54) SYSTEMS AND METHODS FOR MULTIPLE MODE VOICE AND DATA COMMUNICATIONS USING INTELLIGENTLY BRIDGED TDM AND PACKET BUSES

(75) Inventor: Scott K. Pickett, Los Gatos, CA (US)

(73) Assignee: Converged Data Solutions, Inc., Marshall, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 12/002,799

(22) Filed: Dec. 15, 2007

(65) Prior Publication Data

US 2008/0228972 A1 Sep. 18, 2008

Related U.S. Application Data

(63) Continuation of application No. 10/325,346, filed on Dec. 19, 2002, now Pat. No. 7,310,308, which is a continuation of application No. 10/143,309, filed on May 10, 2002, now Pat. No. 6,744,758, which is a continuation of application No. 09/951,283, filed on Sep. 13, 2001, now Pat. No. 6,389,009, which is a continuation of application No. 09/751,948, filed on Dec. 28, 2000, now Pat. No. 6,292,482, which is a continuation of application No. 09/055,072, filed on Apr. 3, 1998, now Pat. No. 6,181,694.

(51) Int. Cl.
*H04J 3/16* (2006.01)

(52) U.S. Cl. ....................................................... 370/466

(58) Field of Classification Search ........................ None
See application file for complete search history.

(56) References Cited

U.S. PATENT DOCUMENTS

| | | | | |
|---|---|---|---|---|
| 4,958,366 A | | 9/1990 | Hashimoto | 379/70 |
| 5,014,266 A | | 5/1991 | Bales et al. | 370/354 |
| 5,136,633 A | | 8/1992 | Tejada | 379/88.2 |
| 5,153,908 A | | 10/1992 | Kaizawa et al. | 379/157 |
| 5,255,314 A | | 10/1993 | Applegate et al. | 379/229 |
| 5,381,468 A | | 1/1995 | Ozawa | 379/136 |
| 5,452,289 A | | 9/1995 | Sharma et al. | |
| 5,521,910 A | | 5/1996 | Matthews | |
| 5,533,018 A | * | 7/1996 | DeJager et al. | 370/395.5 |
| 5,546,392 A | | 8/1996 | Boal et al. | |
| 5,555,541 A | * | 9/1996 | Yazawa et al. | 370/385 |

(Continued)

OTHER PUBLICATIONS

U.S. Patent Application 2004/0120251, published Jun. 2004, issued to Shanley et al., classification of 370/225.

(Continued)

*Primary Examiner* — Chirag Shah
*Assistant Examiner* — Jenkey Van
(74) *Attorney, Agent, or Firm* — Loudermilk & Associates

(57) ABSTRACT

Systems and methods by which voice/data communications may occur in multiple modes/protocols are disclosed. In particular, systems and methods are provided for multiple native mode/protocol voice and data transmissions and receptions with a computing system having a multi-bus structure, including, for example, a TDM bus and a packet bus, and multi-protocol framing engines. Such systems preferably include subsystem functions such as PBX, voice mail and other telephony functions, LAN hub and data router. In preferred embodiments, a TDM bus and a packet bus are intelligently bridged and managed, thereby enabling such multiple mode/protocol voice and data transmissions to be intelligently managed and controlled with a single, integrated system.

17 Claims, 5 Drawing Sheets

Voice / Data Services
58
12
FAX
44
82
POT
POT
POT
T-1/PRI
POT
Emerg.
Wire Less
ATM
Module Upgrade
24
24
22
Print
77
TDM BUS
78
84A
FAX/ Modem
75
90
Packet 1
74
Switch MUX
79A
HDLC
ATM
DSP
80A
24
24
DSP
86
86
79B
79C
79D
80B
76
73A
A T M
H D L C
73B
HDLC
73B
Router Bridge
50
Packet 2
Buffer
71
83
LAN BUS
81
84
72
70
84
Processer / System Resources
LAN/NS
Control
92
Signaling, PBX, Connect, B/W Mgmt.

U.S. PATENT DOCUMENTS 5,577,105 A 11/1996 Baum et al.
5,579,301 A 11/1996 Ganson et al.
5,600,646 A 2/1997 Polomski
5,606,599 A 2/1997 O'Mahony et al.
5,659,542 A 8/1997 Bell et al.
5,689,550 A 11/1997 Garson et al. .................. 379/89
5,692,035 A 11/1997 O'Mahony et al.
5,717,689 A 2/1998 Ayanoglu
5,742,596 A 4/1998 Baratz et al. .................. 370/356
5,751,968 A 5/1998 Cohen
5,761,201 A 6/1998 Vaudreuil .................. 370/392
5,761,281 A 6/1998 Baum et al.
5,809,021 A * 9/1998 Diaz et al. .................. 370/364
5,825,771 A 10/1998 Cohen et al.
5,864,608 A 1/1999 Brownmiller et al.
5,867,714 A 2/1999 Todd et al. .................. 717/172
5,875,192 A 2/1999 Cam et al.
5,892,764 A 4/1999 Riemann et al. .................. 370/401
5,896,512 A 4/1999 Einbinder et al.
5,946,386 A 8/1999 Rogers et al. .................. 379/265
5,978,468 A 11/1999 Benson .................. 379/377
5,999,605 A 12/1999 Yoo .................. 379/165
6,009,101 A 12/1999 Schoo et al.
6,018,567 A 1/2000 Dulman
6,018,571 A 1/2000 Langlois et al.
6,034,968 A 3/2000 Park et al.
6,058,117 A 5/2000 Ennamorato et al.
6,058,166 A 5/2000 Osder .................. 379/88.05
6,072,796 A 6/2000 Christensen et al.
6,083,163 A 7/2000 Wegner et al.
6,088,361 A 7/2000 Hughes et al.
6,131,121 A 10/2000 Mattaway et al.
6,145,465 A 11/2000 Pickett .................. 370/465
6,151,628 A 11/2000 Xu et al.
6,154,463 A 11/2000 Pickett .................. 370/466
6,181,694 B1 * 1/2001 Pickett .................. 370/353
6,181,736 B1 1/2001 McLaughlin et al.
6,219,697 B1 4/2001 Lawande et al.
6,204,084 B1 5/2001 Oran .................. 370/352
6,226,303 B1 5/2001 Levens et al.
6,240,084 B1 5/2001 Oran et al. .................. 370/352
6,243,398 B1 6/2001 Kahane et al.
6,259,538 B1 7/2001 Amit et al.
6,266,340 B1 7/2001 Pickett et al. .................. 370/442
6,292,482 B2 9/2001 Pickett .................. 370/352
6,292,773 B1 9/2001 Bernardes .................. 379/88.05
6,304,574 B1 10/2001 Schoo et al.
6,317,783 B1 11/2001 Freishtat et al. .................. 709/218
6,332,153 B1 12/2001 Cohen
6,366,578 B1 4/2002 Johnson .................. 370/353
6,389,009 B1 5/2002 Pickett .................. 370/352
6,560,222 B1 5/2003 Pounds et al. .................. 370/353
6,577,623 B1 6/2003 Kawai et al. .................. 370/354
6,628,650 B1 9/2003 Saito et al. .................. 370/369
6,633,848 B1 10/2003 Johnson .................. 704/277
6,639,913 B1 10/2003 Frankel et al. .................. 370/356
6,651,063 B1 11/2003 Vorobiev .................. 707/10
6,721,308 B1 4/2004 Ahn .................. 370/353
6,744,758 B2 6/2004 Pickett .................. 370/352
6,763,017 B1 7/2004 Buckingham .................. 370/352
6,775,373 B2 8/2004 Stoughton .................. 379/219
6,801,609 B2 10/2004 Fullarton et al. .................. 379/201.02
6,868,509 B2 3/2005 Gale et al. .................. 714/43
6,885,657 B1 4/2005 Rabenko .................. 370/352
6,954,463 B1 10/2005 Ma et al. .................. 370/401

OTHER PUBLICATIONS

U.S. Patent Application 2003/0165230 A1, published Sep. 2003, issued to Reuss, Edward L., classification 4379/265.02.

Mier et al., "IP-PBXs: Ready and waiting", apparently dated Jan. 1, 2002.

"Key/Hybrid Systems and PBX Systems: Comparison Columns", Google cache of http://mdev temple edu/gartner/datapro//z1945 9 htm, apparently dated May 1, 2001.

Microsoft White Paper, "The Microsoft Windows Telephony Platform Using TAPI 2 0 and Windows to Create the Next Generation of Computer-Telephony Integration", 1996, from title page through p. 27.

Press Release, "VocalTec Links Phones to Web", Aug. 2, 1996, pp. 1-3.

System Brief, "VocalTec Telephony Gateway", 1997, pp. 1-4.

Press Release, "VocalTec, Cisco, Dialogic & other industry leaders hand together in internet telephony rapid deployment team for widespread product compatibility", Nov. 12, 1996, pp. 1-2.

Press Release, "VocalTec introduces the internet phone telephony gateway linking traditional and internet telephone networks", Mar. 8, 1996, pp. 1-2.

Brochure, "VocalTec Telephony Gateway Key Components", undated, pp. 1-3.

Brochure, "VocalTec Telephony Gateway Features", undated. pages 1-2.

Brochure, "VocalTec Telephony Gateway Requirements", undated, pp. 1-2.

Brochure, "VocalTec Telephony Gateway Calling Options", undated, pp. 1-2.

Brochure, "VocalTec Telephony Gateway", undated, pp. 1-2.

Lucent Technologies, "Definity Enterprise Communications Server, Release 6 Overview", Jan. 1998, title page through p. IN10.

Lucent Technologies, "MultiMedia Communications eXchange System Administrator's Guide and Technical Reference Manual Rcleas 2.0M". Jul. 1997, title page through p. 685.

Lucent Technologies, "Definity Communications System, Generic 3 System Description and Specifications," Mar. 1996.

Intel Telecom Products D/4IESC Global SCSA 4-Port Voice Processing Board.

Preliminary Invalidity Contentions of Altigen Communications. Inc., U.S. District Court, Northern District of California, San Francisco Division, Case No. C02 04253 JSW, Jun. 3, 2003.

* cited by examiner

Voice / Data Services
58
12
FAX
44
82
POT
POT
POT
T-1/PRI
POT
Emerg.
Wire Less
ATM
Module Upgrade
77
TDM BUS
78
84A
FAX/ Modem
75
90
Switch MUX
74
DSP
76
86
86
73A
A T M
H D L C
73B
HDLC
73B
Buffer
71
72
84
84
79A
HDLC
ATM
DSP
79B
79C
79D
Router Bridge
83
50
Packet 1
80A
Packet 2
80B
24
24
22
Print
24
24
LAN BUS
81
70
Processer / System Resources
LAN/NS
Signaling, PBX, Connect, B/W Mgmt.
Control
92

SYSTEMS AND METHODS FOR MULTIPLE MODE VOICE AND DATA COMMUNICATIONS USING INTELLIGENTLY BRIDGED TDM AND PACKET BUSES

This application is a continuation of application Ser. No. 10/325,346, filed Dec. 19, 2002, now U.S. Pat. No. 7,310,308, which is a continuation of application Ser. No. 10/143,309, filed May 10, 2002, now U.S. Pat. No. 6,744,758, which is a continuation of application Ser. No. 09/951,283, filed Sep. 13, 2001, now U.S. Pat. No. 6,389,009, which is a continuation of application Ser. No. 09/751,948, filed Dec. 28, 2000, now U.S. Pat. No. 6,292,482, which is a continuation of application Ser. No. 09/055,072, filed Apr. 3, 1998, now U.S. Pat. No. 6,181,694.

FIELD OF THE INVENTION

The present invention relates to systems and methods for transmitting and receiving voice and data in multiple modes, and more particularly to systems and methods for multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router.

BACKGROUND OF THE INVENTION

Businesses, particularly small to medium size offices, typically have a need for a variety of voice and data communications. For example, a typical office might have a dedicated fax machine, using a dedicated or shared telephone line, one or more telephone lines for voice communications, perhaps coupled to a central or distributed voice mail system(s), and one or more computers or computer networks, often coupled to telephone lines via one or more modems. Many offices now use the Internet in some form for business communications or research or the like, often by way of a modem or modem pool coupled to individual computers.

Typically, such business communication needs have been fulfilled with piecemeal technical solutions, typically from separate equipment and service vendors, and with separate hardware, software and design considerations.

FIG. 1 illustrates a conventional small office communication configuration. Voice communication system 1 typically is implemented by way of multiple analog trunks 16 from wide area network ("WAN") 18. WAN 18 often consists of a telecommunication network by way of a local telephone company or other telecommunications service provider. Analog trunks 16 may be directed through switching system 10, which may be a conventional PBX or similar telephone switch. Telephones 12 and voice mail system 14 are coupled to switching system 10. Often, dedicated analog line 16A is coupled to facsimile 44 for facsimile communications.

Data system 2 typically is implemented with a plurality of computers (or workstations, etc.) 24 interconnected by way of packet network 26, which may be a standard Ethernet compliant network or other office network. Network 26 often is coupled to remote access server 32, which is connected to one or more analog trunks 40, and which may include one or more modems in a modem pool. Computers 24 may communicate with remote systems via the modem pool of remote access server 32 over analog lines 40 and WAN 42. Network 26 typically includes a connection to printer 22 and file server 20. In more sophisticated systems, network 26 may be coupled to switching hub 28 and router 30, which is coupled to WAN 42 over digital trunks 38. Data system 2 also may include a connection between one or more of computers 24 to modem 36, which in term is coupled to WAN 42 over dedicated analog trunk 40A.

Such a conventional system often is characterized by piecemeal equipment and network solutions, limited or non-existent coordination and management between voice system 1 and data system 2, non-optimized or non-integrated equipment, and inefficient use of costly network services (telephone lines, data lines, etc.), such as duplicate and often idle phone and data network lines, often provided from multiple equipment/service providers. In general, such conventional systems are neither constructed nor operated in a manner to provide efficient and integrated voice/data communications.

SUMMARY OF THE INVENTION

The present invention is intended to address various disadvantages of such conventional communication systems. The present invention provides various systems and methods, perhaps more succinctly a platform, by which voice and data communications may occur in multiple modes and various protocols, and more particularly systems and methods for multiple native mode voice and data transmissions and receptions with a communications/computing system having a multi-bus structure, including, for example, a TDM bus, a packet bus and a control bus, and multi-protocol framing engines, preferably including subsystem functions such as PBX, voice mail and other telephony functions, email and/or file server, Internet server, LAN hub and data router. With the present invention, a platform and various processes are provided in which a TDM bus and a packet bus are intelligently bridged and managed, thereby enabling such multiple mode/protocol voice and data transmissions to be intelligently managed and controlled with a single, integrated system.

In preferred embodiments, a computer or other processor includes a local area network controller, which provides routing and hubs and/or switches for one or more packet networks. The computer also is coupled to a multiple buffer/framer, which serves to frame/deframe data to/from the computer from TDM bus. The buffer/framer includes a plurality of framer/deframer engines, supporting, for example, ATM and HDLC framing/deframing, and raw buffering of voice data or the like. The buffer/framer is coupled to the TDM bus by way of a multiple port or multiport switch/multiplexer, which includes the capability to intelligently map data traffic between the buffer/framer and the TDM bus to various slots of the TDM frames. Preferably, a DSP pool is coupled to one or more the switch/multiplexer ports and/or the buffer/framer in a manner to provide various signal processing and telecommunications support, such as dial tone generation, DTMF detection and the like. The TDM bus is coupled to a various line/station cards, serving to interface the TDM bus with telephone, facsimiles and other telecommunication devices, and also with a various digital and/or analog WAN network services. The present invention provides a platform by which processing functions may be switched in to provide support for a wide range of network, vendor and application services.

With the present invention, a full PBX-type telecommunication system may be provided by way of the computer/processor and associated telephony hardware and software. Functions such as voice mail, automated attendant, call forwarding, hold, transfer, caller ID, conferencing and other telephony functions may be similarly provided. While supporting such telephony functions in their native mode primarily by way of the TDM bus, the computer/processor also supports concurrent packet data transmissions over the LAN subsystem and packet bus(es). As needed to efficiently support various voice/data communications in the particular office/work environment, the buffer/framer and switch/multiplexer provide a multi-protocol router functionality, enabling the TDM bus traffic and the packet bus traffic to be intelligently bridged and managed without degradation of each other, and without requiring translation or transcoding. With the present invention, the same WAN services may be intelligently managed and controlled for simultaneous voice, video and data traffic.

The computer/processor supports a variety of applications, such as remote configuration, management and back-up, bandwidth allocation and control, least cost routing, voice over Internet Protocol (or "voice over IP"), as well various telephony related applications. In certain preferred embodiments, audio/video data streams, including such as H.320 and H.323 data streams, also are intelligently managed and controlled. In certain preferred embodiments, management applications (such as the SNMP protocol) enable the system to be remotely monitored and configured via a web browser-type access.

Accordingly, it is an object of the present invention to provide simultaneous voice, video and data communications with a single, integrated system.

It is another object of the present invention to provide an intelligently controlled and managed processor bridge between one or more TDM buses and one or more packet buses.

It is yet another object of the present invention to provide an integrated PBX, router and hub to support such simultaneous voice, video and data communications.

It is still another object of the present invention to provide a multi-protocol buffer/framer and switch/multiplexer in order to provide multi-protocol routing and intelligent time slot mapping to the TDM bus, preferably including DSP resources coupled to the buffer/framer.

Finally, it is an object of the present invention to provide systems and methods allowing a broad set of services and functions to co-exist in the same system, and leveraging shared resources while providing a high level interface and intelligence that allows for the shared resources to be dynamically allocated and re-allocated.

Other objects, features and advantages of the various embodiments of the present invention described herein will be apparent to those skilled in the art.

BRIEF DESCRIPTION OF THE DRAWINGS

The above objects and other advantages of the present invention will become more apparent by describing in detail the preferred embodiments of the present invention/with reference to the attached drawings in which.

DETAILED DESCRIPTION OF THE PREFERRED EMBODIMENTS

Although various preferred embodiments of the present invention will be disclosed for illustrative purposes, those skilled in the art will appreciate that various modifications, additions and/or substitutions are possible without departing from the scope and spirit of the present invention.

Figure 2:
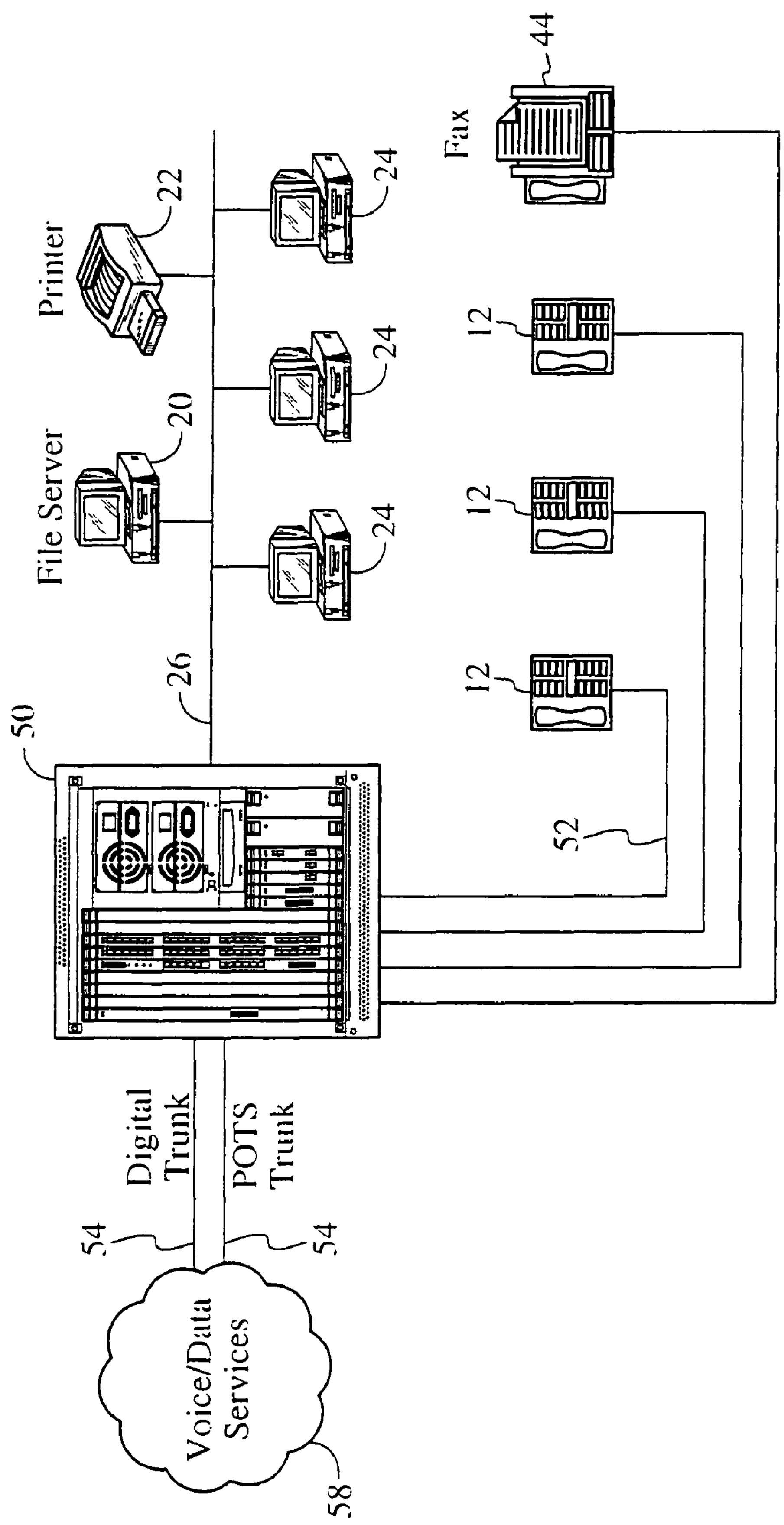
FIG. 2 provides an overview of an office communications system in accordance with preferred embodiments of the present invention.

In accordance with preferred embodiments of the present invention, systems and methods are provided to enable voice, data, video and other communications to occur in an efficient and integrated manner, intelligently allocating and utilizing available communications resources. FIG. 2 provides an overview of such a system in accordance with one preferred embodiment of the present invention.

Communications system 50 provides an integrated system for controlling and managing communications such as in an office. Communications system 50 communicates over ports 26 to file server 20, printer 22 and one or more computers 24. Ports 26 typically includes a packet bus such as Ethernet, "fast" Ethernet, ATM or other LAN technology (in other embodiments, LAN technology, such as token ring, may be coupled to an appropriately configured port). Communications system 50 includes devices for controlling ports 26, including controllers such as what are known as a network interface controller (NIC), which may integrate a media access controller (MAC) for control of and interface to ports 26. Connected to ports 26 may be a variety of devices, such as one or more file servers 20, computers 24, printers 24 and other computing, peripheral or similar devices suitable for interconnection with ports 26. Other network devices, such as routers, switches, bridges and the like also may be connected to ports 26. In a one preferred embodiment, ports 26 is an Ethernet-type LAN to which is connected to a variety of devices as determined by the needs of the particular office/work environment. The present invention effective integration of the packet data LAN and router-type functions with the telephony and server functions, which enables unique operations and the initiation or completion of calls or transactions or the like, without having access to traditional, dedicated devices, peripherals and communications services.

Communications system 50 includes the functionality of what is known as a PBX (as will be described further). In preferred embodiments, communications system 50 is connected to a plurality of telecommunication devices, such as telephones 12, facsimile 44 and other suitable telecommunications devices and access and server functions (such as private voice mail, recording devices, WAN service interface cards, etc.). What is important is that communications system 50 include interfaces for a plurality of telecommunications devices for the particular and complete office/work environment and infrastructure.

Communications system 50 is coupled to WAN voice/data services network(s) 58 through trunks 54. Voice/data services network(s) may include private line, local or long distance carrier networks, Internet, intranet and/or any other current or future WAN-type network services. Trunks 54 may consist of high, medium or low speed digital and/or analog lines, either public or private, and in certain preferred embodiments consist of high speed dedicated resources such as what are known as T-1, PRI (Primary Rate ISDN), ATM, VDSL, HDSL, ADSL, wireless, cascade, proprietary and/or twisted pair analog lines from a local telephone company. What is important is the communications system 50 is coupled to WAN services, trunks and the like in a manner that the user, service provider, administrator and/or algorithm has determined will provide adequate or required resources, on a cost-effective basis, for the particular office/work environment and operating conditions.

Figure 1:
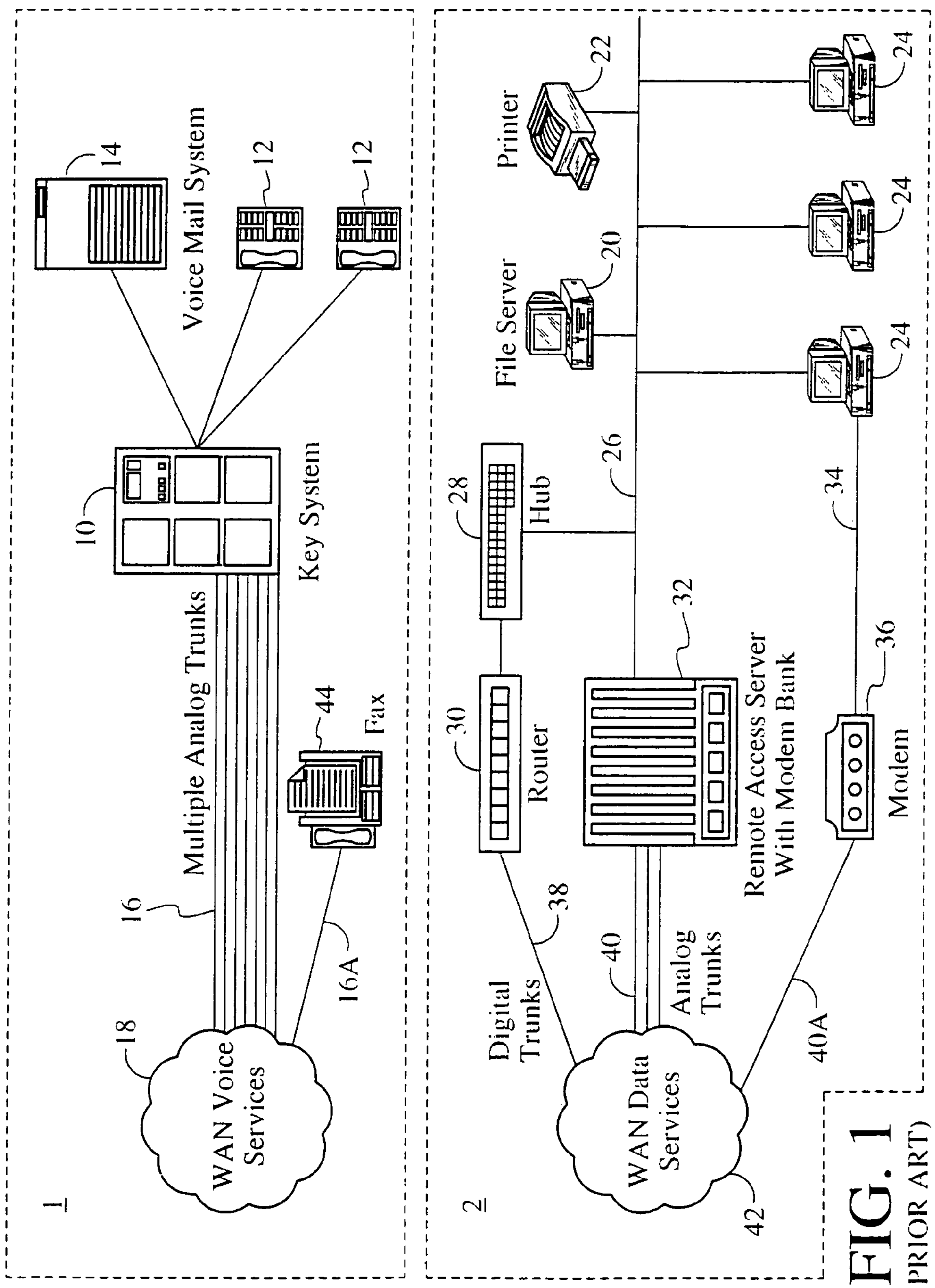
FIG. 1 illustrates a typical, conventional office communications configuration.

In contrast to FIG. 1, the communications system of FIG. 2 provides an integrated solution for voice and data communication services, to which may be connected the WAN network services and telecommunications, computing and other devices as determined by the particular office/work environment.

Figure 3:
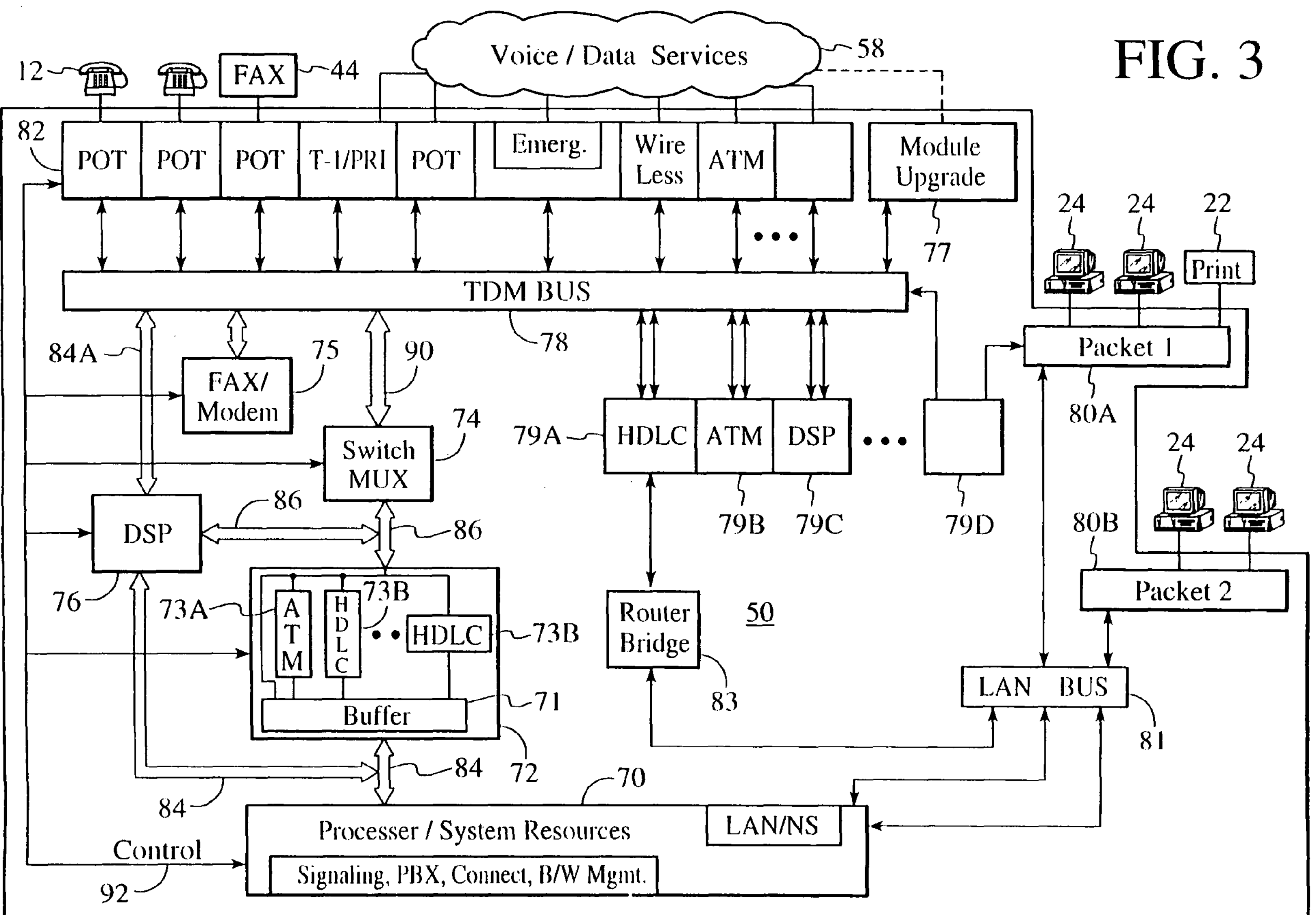
FIG. 3 is a block diagram illustrating preferred embodiments of the present invention.

Referring to FIG. 3, various subsystems, components, buses and the like of preferred embodiments of communications system 50 will be described in greater detail.

Communications system 50 is controlled by host processor/system resources 70, which in preferred embodiments include a computer powered, for example, by a commercially available or other microprocessor and an embedded and/or commercially available operating system). What is important is that processor/system resources 70 provide sufficient processing power, memory and storage resources (RAM, ROM, hard disk, magnetic or other storage, etc.), bus and other resources in order to control the various subsystems and components as will be described. IN particular, computer/system resources 70 enables automatic internal negotiation, control and enabling of services and applications. Although not expressly shown, processor/system resources 70 also may include other components of a relatively high-end personal computer, workstation or server, such as a display device, keyboard, serial ports, parallel ports, power supply and the like. The various subsystems and components of communications system 50 are intelligently controlled, managed and monitored by processor/system resources 70. Processor/system resources 70 provides system and server management software and the like, and a platform for various server applications as described herein.

Host processor/system resources 70 is coupled to buffer/framer 72 via bus 84, which in preferred embodiments consists of a computer bus such as what are known as a PCI bus or ISA bus (in other embodiments, other suitable computer-type buses are utilized, which may include proprietary local buses). Buffer/framer 72 includes buffer 71 and preferably includes a plurality of multi-protocol framing/deframing engines, such as for what are known as asynchronous transfer mode (ATM) or high-level data link control (HDLC) protocols, which may be synchronous or asynchronous. In other embodiments, other communication protocol framers/deframers are provided, as may be desired by the particular office/work environment. Buffer/framer 72 in certain preferred embodiments includes, for example, one or more ATM framers/deframers 73A and one or more, and preferably a plurality of, HDLC framers/deframers 73B. Although not expressly shown, buffer/framer 72 includes other controlling circuits (such as a slot mapping memory, multiplexers/demultiplexers, arbitration, control and other circuitry) such as, for example, described in U.S. Pat. No. 5,533,018 to DeJager, et al. for "MULTI-PROTOCOL/PACKET FRAMING OVER AN ISOCHRONOUS NETWORK," which is hereby incorporated by reference. As will be described in greater detail, buffer/framer 72 includes the capability to transfer raw or protocol-processed data, which may be mapped to particular slots of TDM bus 78 and made available on different ports. Buffer/framer 72 is controlled by processor/system resources 70 as diagrammatically indicated by control line(s) 92 (control line(s) 92 may be implemented as part of a bus structure, such as bus 84). In preferred embodiments, processor/system resources 70 includes redundant disk or other storage, redundant power supplies and data back-up to magnetic or other media in order to enhance fault tolerance of the system.

Processor/resources 70 also may be connected to DSP 76. DSP 76 preferably consists of a single digital signal processor or multi-digital signal processor resource pool, which serves to provide a variety of functions within communications system 50. In preferred embodiments, DSP 76 generates dial tones (such as for telephones 12), DTMF digit detection and decoding, echo cancellation, coding/decoding functions, voice conferencing, voice compression, voice recognition and the like. In other embodiments, DSP 76 performs data compression, transcoding, processing for voice communications using an Internet protocol ("IP") or the like. In general, DSP 76 provides a set of processing and memory resources to support the various voice/data services controlled and managed by processor/resources 70. As illustrated by bus connection 84A, DSP 76 alternatively may be coupled directly to TDM bus 78.

Switch/multiplexer 74 communicates bidirectionally with buffer/framer 72 and preferably from DSP 76, as illustrated, over bus 86. Switch/multiplexer 74 also communicates with TDM bus 78, as illustrated, over bus 90. TDM bus 78 preferably is a time division multiplexed bus as is known in the art (such as, for example, what is known as an MVIP or multi-vendor integration protocol type bus), and provides in certain preferred embodiments 256 channels/slots per TDM frame (the present invention is not limited to a single TDM bus; in alternative embodiments, more than one TDM bus or other types of TDM buses are utilized). TDM bus 78 allows communication between devices on the bus by way of circuit switching techniques. This type of switching allows for simple and inexpensive communication of voice through, for example, what are known as pulse code modulation ("PCM") techniques. Switch/multiplexer 74 preferably is implemented with one or more switching/serial time division multiplexing circuits, such as, for example, described in U.S. Pat. No. 5,541,921 to Swenson, et al. for "ISOCHRONOUS SERIAL TIME DIVISION MULTIPLEXER," which is hereby incorporated by reference. Switch/multiplexer 74, under control of processor/system resources 70, provides the capability for various voice/data signals to be controllably switched to desired slots of TDM bus 78.

Coupled to TDM bus 78 are line, station, trunk, or other interface cards 82. Cards 82 provide CODEC, line interface, off-hook detect and other functions as are known in the art to support various telecommunication devices (such as telephones 12 and facsimile 44) and WAN-type network services (such as voice/data services 58) that are communicating with communications system 50 via TDM bus 78. In preferred embodiments cards 82 provide points of termination for a plurality of telephones 12, one or more facsimiles 44, and various T-1, PRI, ATM, analog and/or other WAN-type network services as determined by the particular office/work environment. Cards 92, under control of processor/system resources 70, may include points of termination for emergency or backup telephone services and the like, such as in the event of a power failure or to provide analog services in the event a dedicated resource such as a T-1 is unavailable for some reason.

Communication system 50 also may include fax modem 75, which, under control of processor/system resources 70, may process incoming/outgoing facsimile transmissions. In the preferred embodiment, fax modem 75 is coupled to TDM bus 78 as illustrated, although in other embodiments fax modem 75 may be coupled in alternative arrangements, such as to switch/multiplexer 74 and/or DSP 76.

Communication system 50 also may include available card slots on TDM bus 78 for one or more module upgrade 77. Additional resources and/or functionality may be added to communication system 50 as needed by way of module or line card upgrade(s) 77, or by, for example, the addition of one more cards such as ATM controller 79B and DSP 79C. Through the use of such module upgrades or additional cards, etc., one or more minimal configurations of communication system 50 may be provided, with additional resources and/or functionality added by the insertion of additional cards to TDM bus 78. In accordance with preferred embodiments of the present invention, software upgrades for processor/system resources 70, or for other resources in the communications system, also may be applied.

Processor/system resources 70 also is coupled to one or more packet buses, such as packet buses 80A and 80B, which may be through a bus such as LAN bus 81. Effectively, packet buses 80A and 80B provide multiple hubs or switches to intercommunicate between one or more packet networks, which in preferred embodiments are Ethernet networks. It should be noted that the bus configuration of FIG. 3 may be considered "logical", and in preferred embodiments the physical bus configuration may be such that TDM bus 78 and packet buses 80A and/or 80B are part of the same physical bus. In such embodiments, packet buses 80A and/or 80B also can intercommunicate directly with central resources (such as processor/system resources 70) as well as station cards and WAN cards (or any other cards) coupled to the TDM bus (this is illustrated in FIG. 3 by card 79D, which is a card simultaneously inserted into/coupled to both TDM bus 78 and packet bus 80 A and which may comprise, for example, a combined LAN interface/functionality and central office (or other WAN interface) card. Such a combined interface card, which may support both LAN and WAN functions (such as described elsewhere herein), enables substantial advantages over conventional systems.

Coupled to packet buses 80A and/or 80B are a variety of computing-type devices, such as computers 24, printer 22, other computers, file servers, backup or storage resources, other networks and the like. Processor/system resources 70, in software and/or hardware, provides a LAN/network subsystem, which includes routing and other related functions to support data communications to and from packet buses 80A and/or 80B and TDM bus 78, etc., through several paths or methods.

In preferred embodiments, a more direct connection between packet bus 80A and/or 80B may be established by way of embedded router or bridge 83. Router/bridge 83 includes a CPU, TCP/IP controller, router, stack, Ethernet interface or other functionality as may be desired to couple LAN bus 81 to, for example, one or more HDLC controllers 79A. Through the use of router/bridge 83, communications between packet buses 80A and 80B may be accomplished while consuming minimal resources of processor/system resources 70.

Figure 4:
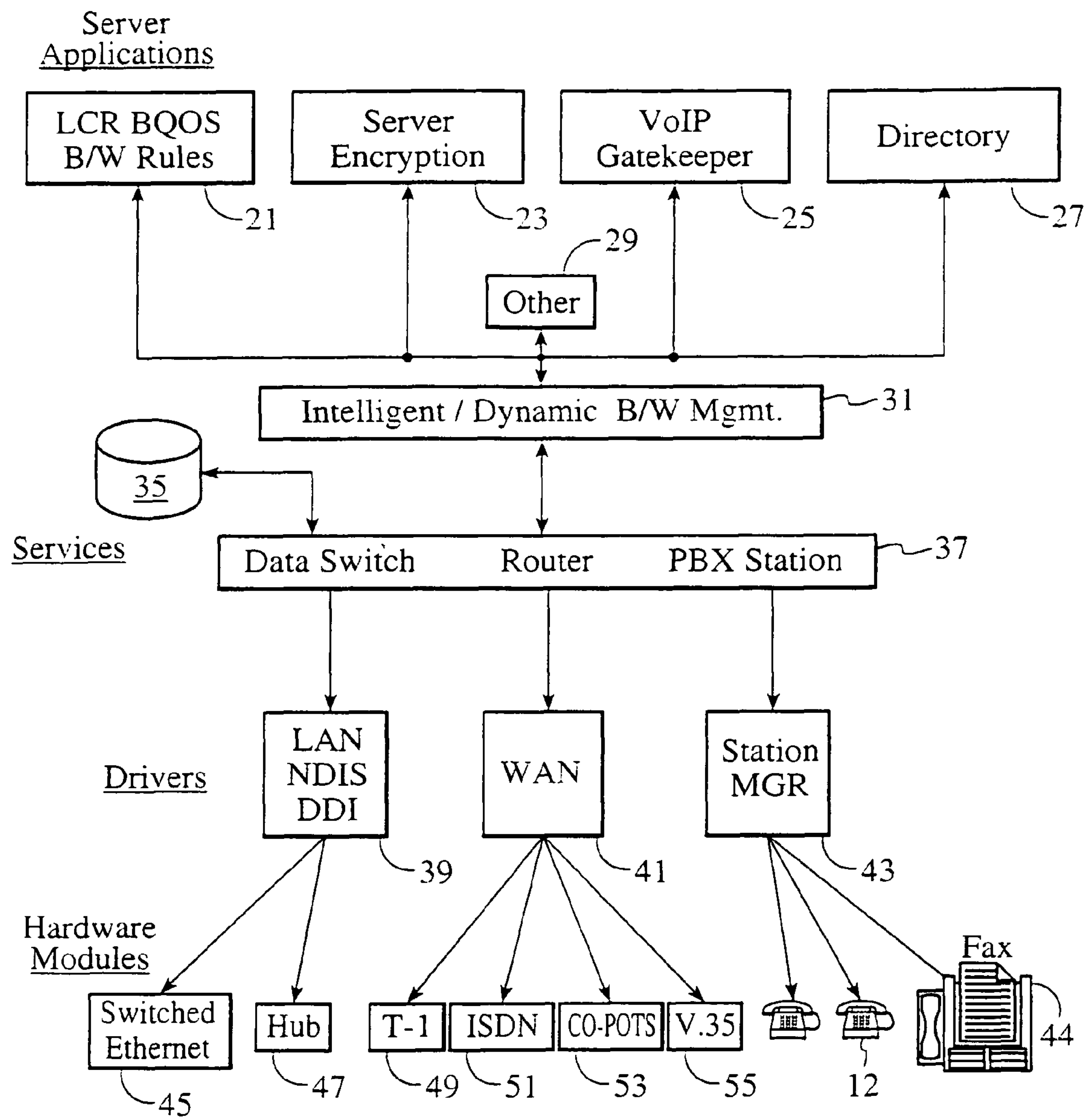
FIG. 4 provides a software/hardware overview of an office communications system in accordance with preferred embodiments of the present invention.

FIG. 4 provides a software/hardware overview of an office communications system in accordance with preferred embodiments of the present invention. It should be noted that the preferred embodiment of FIG. 3, with appropriate software in processor/system resources 70, may provide the software/hardware described in connection with FIG. 4, as will be appreciated by those skilled in the art.

At the server applications level, various software applications may be provided for operation in conjunction with the hardware illustrated, for example, in FIG. 3. Such software applications may include what are know as least cost routing ("LCR"), best quality of services ("BQOS") and bandwidth ("B/W") rules 21. LCR, BQOS and B/W rules 21 provide tables, information, rules and/or algorithms by which data and voice communications may be allocated/and/or controlled with respect to, for example, the various types of voice/data network services that are available to communications system 50. Such information may include the current cost of utilizing various resources (based on time of date, amount of usage, integrated amount of usage over some period of time, etc.), and also priority rules for the various types of communications provided by communications system 50. For example, phone calls may be assigned a priority 1, facsimile calls a priority 2, VoIP calls a priority 3, facsimile over IP calls a priority 4, category 1 data communications a priority 5, and other data communications a priority 6. In preferred embodiments, the priority assignments may change by time of day or month, and/or the priority assignments may be different with respect to different network resources and the like.

Server encryption applications 23 may be provided in order to provide encryption or similar coding or processing of voice/data communications processed by communications system 50. VoIP gatekeeper 50 may be provided to service and control voice over Internet protocol ("VoIP") communications. As more specifically described below, various types of VoIP communications may be effectively managed and controlled in accordance with preferred embodiments of the present invention, such as, for example, a determination that acceptable conditions exist on the Internet for such communications. Directory 27 may be provided in order to make various types of directory information available to users of communications system 50. Directory information provided by directory 50 may include names, telephone extensions, address or other personal or work information regarding persons or departments, etc., serviced by communications system 50. Directory 27 also may include similar directory type information for persons or departments, etc. in a remote or other locations, such as may be accessed through voice/data services 58.

In general, with the present invention other applications 29 may be provided to support various types of communications in accordance with preferred embodiments of the present invention.

Intelligent/dynamic B/W, service and resource management 31 is provided to effectively and efficiently control and allocate and de-allocate services and communications resources, such as in accordance with LCR, BQOS, B/W rules 21 (e.g., rules to enable lowest cost, highest quality or otherwise desirable management and control of network or other resources, etc.) or other applications 29 or the like. B/W management 31 also receives as inputs information indicating the total number and types of network resources (of voice/data services 58, for example) that are available to communications system 50, and their status and availability at any given point in time. B/W management 31 may receive as an input, or may generate internally, information indicating how much of a measured usage resource may be available at a given point in time (for example, "frame relay," "private virtual channel" or other network services may be provided on the basis of a predetermined amount of data transmission per fixed time period for a fixed price, with additional charges for usage in excess of the predetermined amount, etc.). As more fully described below, based on the currently available and currently utilized services and resources, B/W management 31 may allocate and de-allocate such services and resources in a desired and/or cost efficient manner.

Services 37, which may be supported by database storage 35 (which may be provided as a part of processor/system resources 70), include data switching services, router services and PBX station services. In general in accordance with preferred embodiments of the present invention, and utilizing resources such as described in connection with FIG. 3, various communication-related services may be advantageously supplied by communications system 50.

For example, data switching services may be provided such as by LAN/NDIS/DDI drivers 39 (LAN, NDIS and DDI being exemplary) through hardware modules such as switched Ethernet 45 and hub 47. Routing services may be provided such as through WAN drivers (specific network services such as PRI and T-1 being exemplary) through hardware modules such as T-1 module(s) 49, ISDN module(s) 51, central office-plain old telephone service (CO-POTS) module (s) 53, V.35 module(s) (it should be understood that various hardware modules may be utilized in accordance with preferred embodiments of the present invention, as desired to implement the various data switching, routing and other communications connections as may be determined by the needs of the particular office/work environment). PBX station services, such as automated attendant, reception, voice mail and the like, may be provided through station manager 43. Station manager 43 provides hardware for connection to various telecommunications devices, such as phones 12, facsimile 44, etc. In general, station manager 43 provides sufficient interface hardware in order to connect to the various devices that may be determined by the needs of the particular office/work environment).

Figure 5:
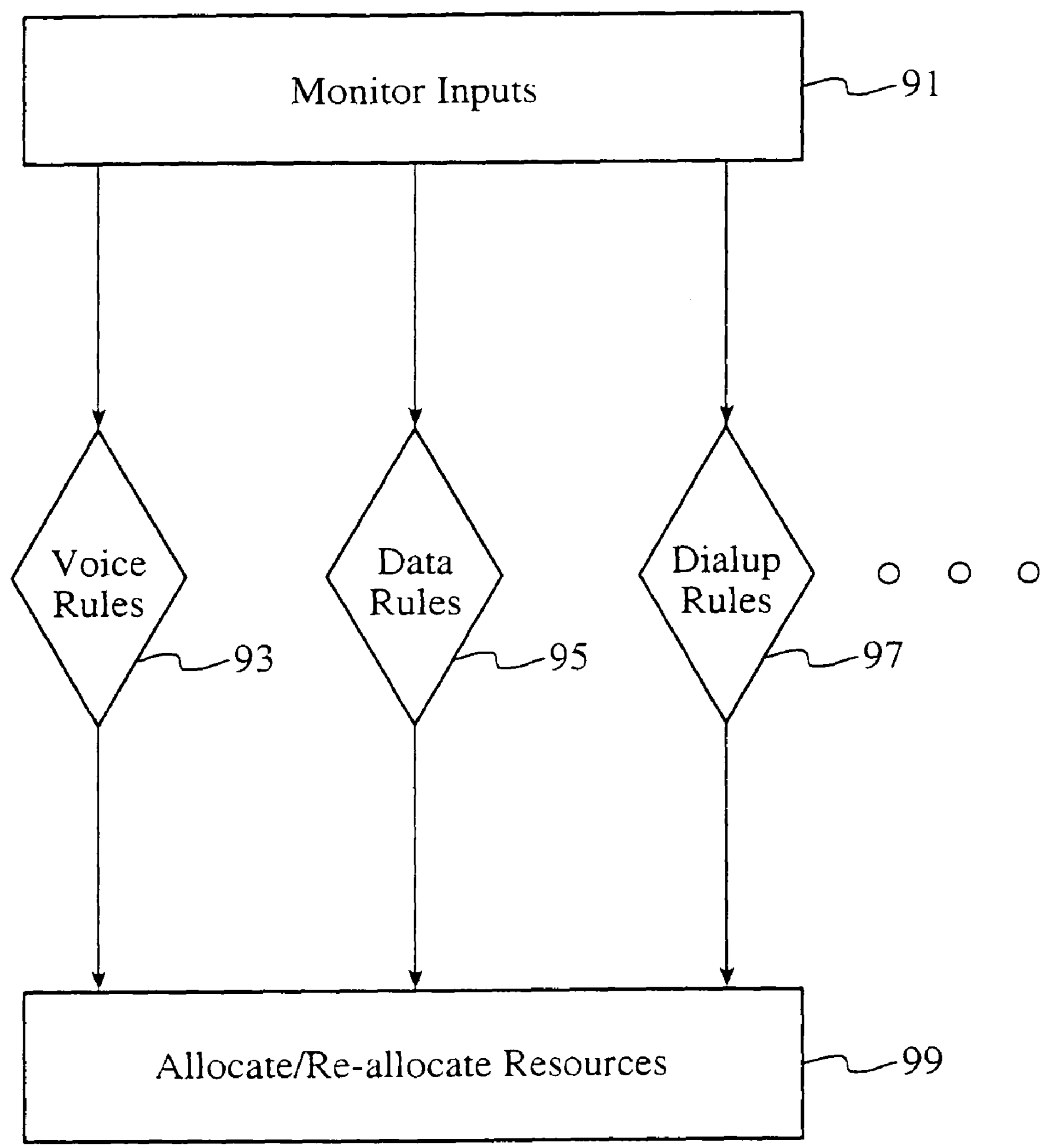
FIG. 5 illustrates the use of services/bandwidth allocation rule table(s) in accordance with preferred embodiments of the present invention.

Referring now to FIG. 5, a general flow chart will be described for illustrating the use of services/bandwidth allocation rules in accordance with preferred embodiments of the present invention.

Server applications, such LCR, BQOS, B/W rules 21, may be considered to have various rule sets, such voice rules 93, data rules 95 and dial-up rules 97 (other rule sets may be provided). Communications system 50 monitors inputs (illustrated as monitor input block 91 of FIG. 5), and based on such inputs and the overall service/network resources available, and in accordance with voice rules 93, data rules 95 and dial-up rules 97, allocates and de-allocates resources (illustrated as allocate/re-allocate resources block 99 of FIG. 5).

Exemplary operations of such preferred embodiments will now be described.

In the event a user picks up one of telephones 12, an off-hook condition is detected by the appropriate card 82, which signals processor/system resources 70 of the off-condition. Processor/system resources 70 controls switch/multiplexer 74 to couple the appropriate card 82 to DSP 76, which generates a dial tone that is coupled to the appropriate telephone 12. The user hears the dial tone and may then proceed to place the desired call. DSP 76 detects the digits of the telephone number of the desired call and provides the detected digits to processor/system resources 70. For an internal call, processor/system resources 70 directs that the called internal telephone receive a ring signal from the appropriate card 82. Upon pick-up of the called internal telephone, the telephone connection between the internal phones is established by way of TDM bus 78 and the appropriate cards 82.

For an external call, processor/system resources 70 attempts to establish the desired connection through the appropriate cards 82 and available voice/data services 58. In attempting to establish such a voice communication connection, processor/system resources preferably follows the general flow illustrated in FIG. 5. Namely, in accordance with available resources (such as of voice/date services 58) and rules such as voice rules 93, data rules 95, dial-up rules 97, etc., an external voice communication may be established by, for example, a POTS line connection, an ISDN B channel, a VoIP connection, etc. In accordance with the present invention, resources may be allocated for the processing of such an external call based on the available resources at the particular time and applicable rules (which may include time of day, priority of call, etc.)

Incoming calls are detected by the appropriate cards 82 and signaled to processor/system resources 70. Connections of voice incoming calls to telephones 12 are established under control of processor/system resources 70 over TDM bus 78.

Although various preferred embodiments of the present invention have been disclosed for illustrative purposes, those skilled in the art will appreciate that various modifications, additions and/or substitutions are possible without departing from the scope and spirit of the present invention as disclosed in the claims.

What is claimed is:

1. A method for providing voice and data communications over a wide area network, comprising:

providing a processor, providing a multi-protocol framing/deframing circuit coupled to the processor over a first bus and receiving data over the first bus of two or more communication protocols, wherein the multi-protocol framing/deframing circuit comprises at least a first protocol processing circuit and a second protocol processing circuit and a buffer coupled to receive data from, and transmit data to, the first bus, wherein the buffer selectively couples data between the first bus and the first and second protocol processing circuits;

providing a multiplexing circuit coupled to the multi-protocol framing/deframing circuit and receiving commands from the processor, wherein the multiplexing circuit selectively transmits data to and receives data from the multi-protocol framing/deframing circuit and selectively transmits data to and receives data from a second bus in a time division multiplexed mode utilizing a plurality of frames, the second bus comprising a time division multiplexed bus, each of the frames comprising a plurality of slots, wherein the multiplexing circuit, under control of the processor, selectively couples data to and from particular slots of the frames;

providing a plurality of interface circuits coupled to the second bus and receiving commands from the processor, wherein the interface circuits are coupled to the wide area network and to one or more telephone devices, wherein the interface circuits selectively transmit data to and receive data from the second bus under control of the processor; and providing a packet bus coupled to the processor, wherein data communications over the packet bus art coupled to the wide area network under control of the processor through the multi-protocol framing/defaming circuit, the multiplexing circuit, and the second bus, wherein voice communications that stay in a circuit-switched form and that are based on one of the one or more telephone devices simultaneously occur over the second bus.

2. The method of claim 1, wherein the second bus comprises an MVIP bus.

3. The method of claim 1, wherein the packet bus comprises an Ethernet bus.

4. The method of claim 1, wherein the data communications occur via the HDLC protocol, wherein the framing/deframing circuit frames and deframes the data communications to and from the HDLC protocol.

5. The method of claim 1, wherein the one or more telephone devices coupled to the interface cards include a plurality of telephones, wherein the plurality of telephones are coupled together through the second bus.

6. The method of claim 5, wherein the processor controls voice communications between one of the telephones and the wide area network, wherein data communications are concurrently occurring between the wide area network and the packet bus.

7. The method of claim 1, wherein one of two or more communication protocols comprises raw data.

8. A method comprising:

providing a TDM bus coupled to a wide area network and to a plurality of telephony devices, wherein the TDM bus couples voice communications that stay in a circuit-switched form between the plurality of telephony devices and between one or more of the telephony devices and the wide area network;

providing a multiplexer coupled to the TDM bus, wherein the multiplexer maps data to predetermined slots of frames of the TDM bus;

providing a framer/deframer circuit coupled to the multiplexer, wherein the framer/deframer circuit comprises at least a first protocol circuit for processing data in accordance with a first protocol and a second protocol circuit for processing data in accordance with a second protocol;

providing a digital signal processor circuit coupled to the framer/deframer and the TDM bus, wherein the digital signal processor circuit provides at least a dial tone or DTMF digit detection for the plurality of telephony devices coupled to the TDM bus; and providing a processor coupled to the digital signal processor circuit and the framer/deframer circuit;

wherein, the processor selectively couples data to the digital signal processor circuit for processing, wherein data communications over the wide area network in accordance with the first protocol occur through the first protocol circuit, multiplexer and TDM bus, wherein data communications over the wide area network in accordance with the second protocol occur through the second protocol circuit, multiplexer and TDM bus.

9. The method of claim 8, wherein the first protocol comprises HDLC.

10. The method of claim 8, wherein the second protocol comprises ATM.

11. The method of claim 8, wherein the first and second protocol s each comprise HDLC.

12. The method of claim 8, further comprising a packet bus coupled to the processor.

13. The method of claim 12, wherein a packet data stream is coupled from the packet bus to the processor, wherein the packet data stream is converted to a first protocol data stream by the first protocol circuit, wherein the first protocol data stream is coupled to the wide area network via the multiplexer and TDM bus.

14. The method of claim 13, wherein the first protocol comprises HDLC.

15. The method of claim 8, further comprising a packet bus coupled to the processor, wherein packet data communications occur over the packet bus and voice communications occur simultaneously over the TDM bus.

16. The method of claim 8, wherein one of the first or second protocols comprises raw data.

17. The method of claim 8, wherein voice communications and data communications concurrently occur between the system and the wide area network.

* * * * *